United States Patent [19]

Miyakawa et al.

[11] Patent Number: 4,884,156
[45] Date of Patent: Nov. 28, 1989

[54] MAGNETIC HEAD HAVING A THIN-FILM AND A COIL

[75] Inventors: Hideaki Miyakawa, Kanagawa; Makoto Kameyama, Chiba, both of Japan

[73] Assignee: Canon Kabushiki Kaisha, Tokyo, Japan

[21] Appl. No.: 330,925

[22] Filed: Mar. 27, 1989

Related U.S. Application Data

[63] Continuation of Ser. No. 80,172, Jul. 30, 1987, abandoned, which is a continuation of Ser. No. 693,499, Jan. 22, 1985, abandoned.

[30] Foreign Application Priority Data

Jan. 26, 1984 [JP] Japan .................................. 59-12490

[51] Int. Cl.4 .............................................. G11B 5/29
[52] U.S. Cl. ..................... 360/121; 360/123; 360/125
[58] Field of Search ............... 360/121, 119, 122, 123, 360/125

[56] References Cited

U.S. PATENT DOCUMENTS

| | | | |
|---|---|---|---|
| 3,651,278 | 3/1972 | Chupity et al. | 360/123 |
| 3,662,119 | 5/1972 | Romankiw et al. | 360/126 |
| 3,716,677 | 2/1973 | Tanaka et al. | 360/126 X |
| 4,085,430 | 4/1978 | Gerkema et al. | 360/119 |
| 4,149,205 | 4/1979 | Berghof et al. | 360/126 X |
| 4,353,102 | 10/1982 | Kanai et al. | 360/123 X |
| 4,357,640 | 11/1982 | Heinz et al. | 360/123 X |
| 4,383,284 | 5/1983 | Isshika | 360/123 |
| 4,439,793 | 3/1984 | Nater | 360/121 |
| 4,601,099 | 7/1986 | Nishiyama | 360/125 |
| 4,774,755 | 10/1988 | Yoshisato et al. | 360/121 X |

FOREIGN PATENT DOCUMENTS

| | | | |
|---|---|---|---|
| 0010714 | 1/1977 | Japan | 360/126 |
| 0606163 | 5/1978 | U.S.S.R. | 360/121 |
| 0836667 | 6/1981 | U.S.S.R. | 360/121 |
| 1012337 | 4/1983 | U.S.S.R. | 360/119 |

Primary Examiner—Robert S. Tupper
Assistant Examiner—Andrew L. Sniezek
Attorney, Agent, or Firm—Toren, McGeady & Associates

[57] ABSTRACT

A magnetic head including a head base consisting of blocks, and having a penetration hole therethrough, a magnetic thin film formed on the head base to define a magnetic circuit and a coil wound around the magnetic thin film and the head base through the penetration hole.

4 Claims, 2 Drawing Sheets

MAGNETIC HEAD HAVING A THIN-FILM AND A COIL

This is a continuation of Ser. No. 07/080,172, filed July 30, 1987, which in turn is a continuation application of Ser. No. 06/693,499, filed Jan. 22, 1985 both of which are now abandoned.

BACKGROUND OF THE INVENTION

1. Field of the Invention

This invention relates to thin-film magnetic heads formed by utilizing a thin-film forming process.

2. Description of the Prior Art

Recently, increased efforts have been devoted to increasing the density of recorded information and to minimizing the bulk and size of the recording and reproducing apparatus. Thus increases the desirability of using a thin-film magnetic head of which the magnetic circuit is formed by magnetic thin films thereby advantageously facilitating minimizing bulk and size and reducing space requirements. Particularly when the thin-film magnetic head is in the form of a composite magnetic head (hereinafter called simply "composite head") having two head gaps arranged adjacent to each other in a direction that crosses their recording direction to trace two tracks at a time, the confronting surfaces of the two magnetic circuits can be made extremely small, and the cross talk between the two magnetic circuits can be significantly lessened.

In the following description of this specification, a discussion will be provided of an example of this kind of composite head. FIG. 1 is a perspective view illustrating the known prior art composite head constructed by using thin-film magnetic layers. In FIG. 1, positioned on a lower magnetic layer 2 made of magnetic material are non-magnetic gap members 4a and 4b each made of non-magnetic material, and insulating layers 6a, 6b, 6c and 6d. Upper magnetic layers 8a and 8b are each formed by laminating magnetic thin films. A coil pattern 10 with its two ends 10a and 10b is provided within the thin-film magnetic head comprised of the lower magnetic layer 2 and the upper magnetic layer 8b.

The composite head shown in FIG. 1, besides having small cross talk between the two heads, makes it possible to reduce the thickness as can be seen from the drawing. But, as sectionally illustrated in FIG. 2, the insulating layer 6c is laminated on the coil pattern 10, the upper magnetic layer 8b being further formed on the insulating layer 6c by using the thin-film forming technique. Because the upper magnetic layer 8a, 8b is, therefore, formed on this uneven surface, the electric-magnetic converting characteristic becomes poor, causing the efficiency of the magnetic head to be lowered to a significant extent. In more detail, when the magnetic thin film is applied, the angle of incidence at which the magnetic material spatters with the surface to be coated, becomes very small so that the force of holding the magnetic material in each concave or convex portion reaches levels as high as several tens of Öe. Along with this, therefore, the magnetic resistance increases, and, as a matter of course, the magnetic permeability also is substantially reduced.

Further, upon consideration of the efficiency in structure of the magnetic head, since the head width is about 60 μm, the width of the magnetic path in which the coil pattern 10 is applied (shown by l in FIG. 1), must be about 150 μm. This implies that the maximum possible number of turns of the coil pattern is only a few. Since the necessary number of turns of the coil for the recording and reproducing head is at least twenty, use must be made of an additional transformer or the like. In this case, not only the performance is lowered by the transformer, but also a large space which the transformer occupies must be provided, thereby adversely affecting of the overall product commercialization.

SUMMARY OF THE INVENTION

With the above-described drawbacks in mind, the present invention has as its object to provide a thin-film magnetic head having improved electric-magnetic converting characteristics.

Another object of the present invention is to provide a thin-film magnetic head capable of limiting the magnetic resistance of a magnetic circuit portion.

Still another object of the invention is to provide a thin-film magnetic head capable of easily increasing the number of turns of a coil.

A further object of the invention is to provide a thin-film magnetic head suited for minimizing the size of an apparatus and serving a space-saving purpose.

According to the present invention, it is proposed as one of its embodiments that the thin-film magnetic head comprises a magnetic circuit including a lower magnetic layer, and an upper thin-film magnetic layer formed on said lower magnetic layer in a laminated shape, wherein said magnetic circuit has a magnetic space having no magnetic layer at the inside thereof as viewed from the laminating direction of the magnetic layer.

A further object of the invention is to provide a thin-film composite magnetic head having small cross talk between two contained magnetic circuits with a good electric-magnetic converting characteristic of each magnetic circuit.

According to the present invention, it is proposed, as another embodiment, that the thin-film composite magnetic head comprises a lower magnetic layer and an upper thin-film magnetic layer laminated on said lower magnetic layer at two places and arranged in a shifted position toward the laminated surface relative to said lower magnetic layer, except at said laminated portions.

Other objects and features of the invention will become apparent from the following detailed description of embodiments thereof by reference to the accompanying drawings.

DETAILED DESCRIPTION OF THE PREFERRED EMBODIMENTS

The present invention will next be described in connection with embodiments thereof applied to composite heads.

Figure 3:
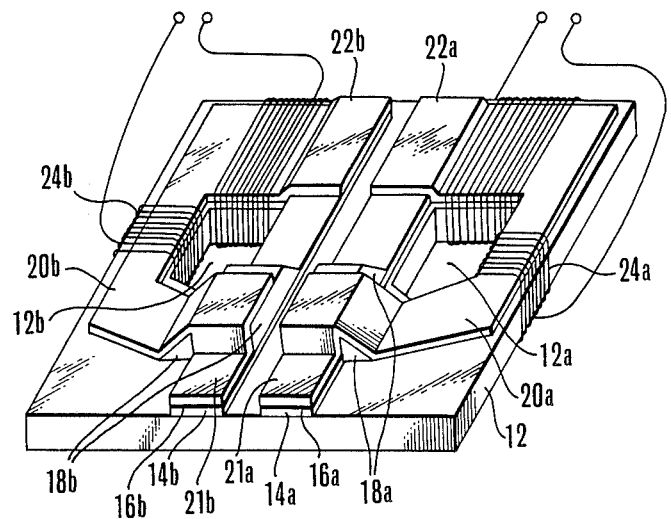
FIG. 3 is a perspective view of an embodiment of a composite thin-film magnetic head according to the present invention.

In FIG. 3 there is shown one embodiment of a thin-film composite magnetic head according to the present invention, where a non-magnetic head base 12 is provided with a pair of penetration holes 12a and 12b for winding. This head base 12 is made of a crystalized glass of which the thermal expansion coefficient is adjusted to a value within the difference of $20 \times 10^{-7}/°C$. From those of magnetic layers to be described later. Two lower thin-film magnetic layers 14a and 14b are arranged on the head base 12 in closely spaced relation to each other. These lower thin-film magnetic layers 14a and 14b may be formed by using a thin-film fabricating process including the steps of applying a coating of soft magnetic material, such as amorphous metal, Sendust, or Permalloy, by spattering or other depositing techniques and then removing unnecessary areas of the coating by ion-milling or other etching techniques.

Non-magnetic gap layers 16a and 16b are formed on the respective lower magnetic layers 14a and 14b in such a way that a coating of non-magnetic material, such as $SiO_2$, is applied to that part of the head base 12, which includes at least the gap portions, by spattering techniques and then the over-hanging portions of the coating are removed by ion-milling or other etching techniques. Insulating layers 18a and 18b play the role of spacing upper magnetic layers, to be described later, away from the lower magnetic layers 14a and 14b. As its material, use may be made of non-magnetic material, for example, $SiO_2$. In this connection, it should be pointed out that as the thickness of the insulating layers 18a and 18b increases, the efficiency of the head increases. In this case, however, the difference between the thermal expansion coefficients of the insulating layer of $SiO_2$ and each of the magnetic layers increases objectionably. To avoid this, another non-magnetic material must be used so that, similarly to the head base 12, the thermal expansion coefficient difference lies below $20 \times 10^{-7}/°C$. In forming the insulating layers 18a and 18b also, a coating of the non-magnetic material is applied on the lower magnetic layers 14a and 14b in laminated layers by spattering means, and the coating is partially etched away by ion-milling means.

20a and 20b are upper thin-film magnetic layers with portions 21a and 21b being laminated on the non-magnetic gap layers 16a and 16b, respectively, and with other portions 22a, 22b, which are spaced away from the portions 21a and 21b, being laminated on the lower magnetic layers 14a and 14b, respectively. Thereby, each of these upper magnetic layers 20a and 20b forms a magnetic circuit together with the respective one of the lower magnetic layers 14a and 14b surrounding the respective penetration hole 12a, 12b as illustrated in the drawing. This upper magnetic layer 20a, 20b may also be formed by the thin-film fabricating process, including the steps of applying a coating of soft magnetic material, such as amorphous metal, Sendust, or Permalloy, by spattering means in laminated relation and then etching away the over-hanging portions of the coating by ion-milling means. It is to be noted 24a and 24b each are a coil wound about the magnetic circuit through the penetration holes 12a, 12b, respectively.

With such a thin-film magnetic head, as the lower and upper magnetic layers 14a, 14b and 20a, 20b are laminated, there is provided a space in which no magnetic layer is present with respect to the laminating direction at the inside of the magnetic circuit so that it is easy to apply a coil to the magnetic head constructed with that magnetic circuit. The use of no coil pattern, therefore, provides an improvement of the magnetic characteristic. Another advantage arising from the possibility of increasing the number of turns of the coil is that there is no need to use a transformer or the like, thus facilitating the space-saving and the size-reducing characteristics of the apparatus.

Figure 1:
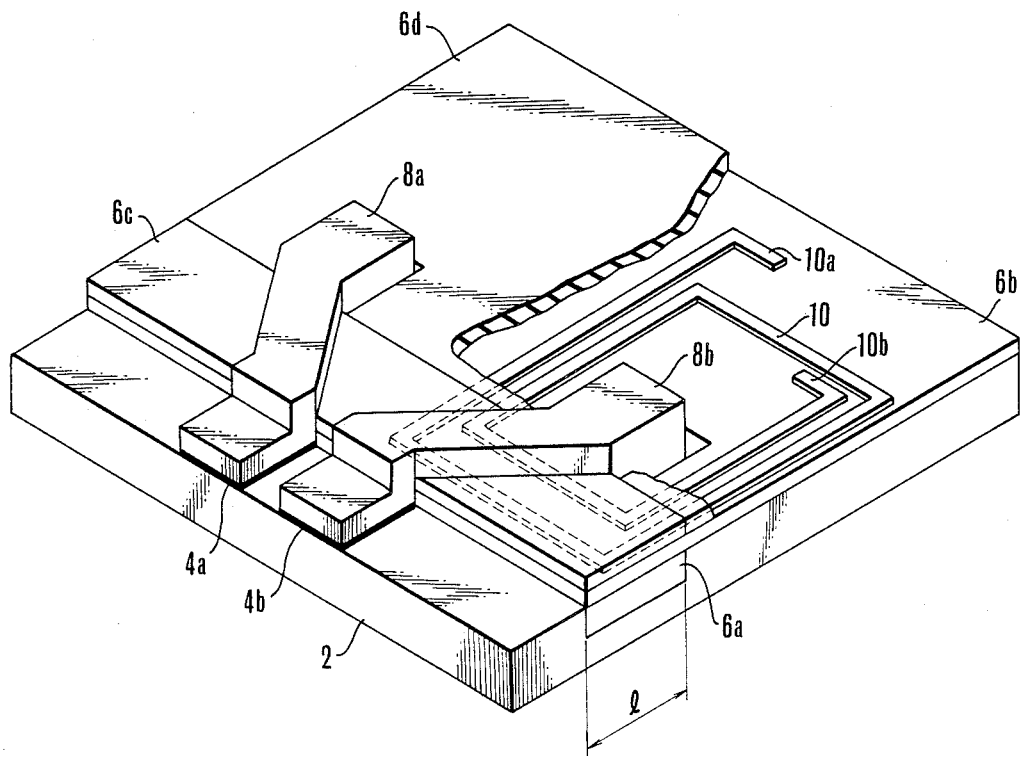
FIG. 1 is a perspective view of a conventional composite thin-film magnetic head.
Figure 2:
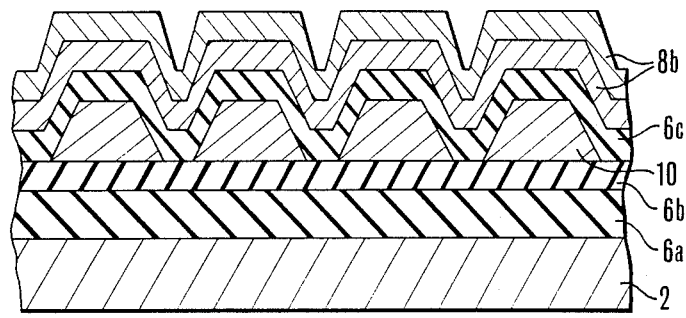
FIG. 2 is a sectional view used to explain the problem of the conventional technique.

Also in view of its use as a composite head, because the confronting areas of the two magnetic circuits are very small, even when compared with those of the thin-film magnetic head of FIG. 1, it is possible to extremely lessen the cross talk between the two cores. For this reason, even in a case when one of the magnetic circuits is solely in use, the resultant electric-magnetic converting characteristic also is very excellent.

Figure 4:
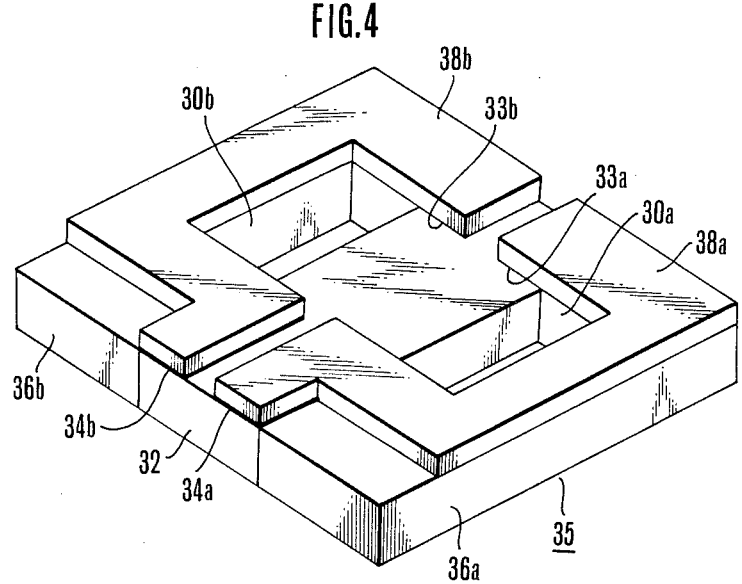
FIG. 4 is a perspective view of another embodiment of the composite thin-film magnetic head according to the present invention.

FIG. 4 in perspective view illustrates a magnetic head core of another embodiment of the thin-film composite magnetic head according to the present invention.

A substrate 32 is made of magnetic material such as ferrite, constituting a lower magnetic layer of the thin-film composite magnetic head of this embodiment, and is flanked by non-magnetic substrates 36a and 36b, each of which is formed with a cutout 30a, 30b so that upon later assembly with the central substrate 32, they will provide penetration holes for applying a winding. Said non-magnetic substrates 36a and 36b are first formed with glass or non-magnetic resin by molding means and then adhered to the central substrate 32, whereby a composite head base 35 is obtained.

It is also to be noted that what is exposed to the air at the central portion of the area of the upper surface of the composite head base 35 is the magnetic material and that it is at either side of this central portion of the magnetic substrate 32 that the penetration holes, formed by the cutouts 30a and 30b in the substrates 36a and 36b, are located. Non-magnetic gap portions 34a and 34b are formed on one of the sides of the central portion of the upper surface of the magnetic substrate 32 in laterally spaced relation to each other. Upper thin-film magnetic layers 38a and 38b are formed on the composite head base 35 in laminated relation at the aforesaid gap portions 34a and 34b and longitudinally opposite portions 33a and 33b thereto, respectively.

Thereby the magnetic substrate 32, as the lower magnetic layer, and the upper thin-film magnetic layers 38a and 38b form magnetic circuits around the aforesaid penetration holes, respectively. Thus, a magnetic head core as illustrated in the drawing is obtained. It is needless to say that to make up a thin-film composite magnetic head from such core, two coils must be applied to the magnetic circuits in such a way that each turn of the coil passes through the aforesaid penetration hole.

The thin-film composite magnetic head shown in FIG. 4 has advantages similar to those of the head shown in FIG. 3 in that the magnetic characteristics are improved, and the possibility of increasing the number of turns in each coil saves considerable space within the apparatus.

Though the foregoing embodiments have been described in connection with the use of two layers for forming the magnetic circuit in laminated relation to each other at two portions thereof, it is also possible to use three or more layers in constructing the magnetic head. For example, the lower and upper thin-film magnetic layers are laminated one upon another at their one portions through at least a part of the gap material layer, the opposite end portions of which are magnetically connected to each other through a magnetic layer either with or without the addition of a further laminated thin-film magnetic layer thereon, this or these layers being previously provided on the substrate, when the magnetic circuit is formed. The use of such a construction of the thin-film magnetic head can, of course, also provide similar advantages to those of the magnetic head of the above-described two embodiments.

While specific embodiments of the invention have been shown and described in detail to illustrate the application of the inventive principles, it will be understood that the invention may be embodied otherwise without departing from such principles.

What is claimed is:

1. A multi-track magnetic head comprising:
   (a) a non-magnetic block having a first plane surface and a pair of penetration holes respectively formed in a direction crossing with the first plane surface;
   (b) a pair of lower magnetic thin film layers, each of which forms at least a part of a magnetic core and is deposited on the first plane surface, said pair of lower magnetic thin film layers having a common plane surface arranged to be parallel with the first plane surface;
   (c) a pair of non-magnetic thin films, each of which operates as a transducing gap of the magnetic head and is deposited on the common plane surface, a distance between the pair of non-magnetic thin films being smaller than a distance between that of the pair of penetration holes;
   (d) a pair of upper magnetic thin film layers, each of which has a part deposited on each of said pair of non-magnetic thin films, a pair of magnetic cores consisting of said pair of lower magnetic thin film layers and said pair of upper magnetic thin film layers and being arranged to enclose around said pair of penetration holes on the first plane surface; and
   (e) a pair of wire-form coils wound around said non-magnetic block and said pair of magnetic cores through said pair of penetration holes.

2. A head according to claim 1, wherein each of said pair of upper magnetic thin film layers has a first part deposited on each of said pair of non-magnetic thin films and a second part deposited on said first plane surface of said non-magnetic block.

3. A head according to claim 2, wherein each of said pair of upper magnetic thin film layers further has a third part directly deposited on each of said pair of lower magnetic thin film layers, said second part being arranged between said first part and said third part.

4. A head according to claim 2, further comprising a pair of insulating members each of which is arranged to insulate a fourth part of each of said pair of upper magnetic thin film layers from each of said pair of lower magnetic thin film layers, said fourth part being arranged between said first part and said second part.

* * * * *